United States Patent [19]

Kuchuk-Yatsenko et al.

[11] 4,175,897
[45] Nov. 27, 1979

[54] APPARATUS FOR REMOVING FLASH FROM RESISTANCE BUTT-WELD JOINTS IN RAILS

[76] Inventors: Sergei I. Kuchuk-Yatsenko, ulitsa Filatova, 1/22, kv. 47; Ivan K. Golomovzjuk, ulitsa Vetryanaya, 28, kv. 1; Valery G. Krivenko, ulitsa Ordzhonikidze, 3, kv. 35; Alexandr I. Kulesh, ulitsa 40 let Oktyabrya, 114/2, kv. 51; Vasily A. Sakharnov, ulitsa Solomenskaya, 41, kv. 93; Ivan L. Lazebny, ulitsa Metrologicheskaya, 1; Fedor K. Porkhun, ulitsa Malokitaevskaya, 73, kv. 56, all of Kiev, U.S.S.R.

[21] Appl. No.: 867,318

[22] Filed: Jan. 5, 1978

[51] Int. Cl.² .......................... B23D 1/08; B26D 3/06
[52] U.S. Cl. ........................ 409/300; 51/178; 51/241 LG; 83/914
[58] Field of Search .......... 90/24 E; 51/178, 241 LG; 83/914

[56] References Cited

U.S. PATENT DOCUMENTS

| 2,124,849 | 7/1938 | Drain et al. ................ 90/24 E X |
| 3,451,309 | 6/1969 | Millwood et al. ............. 90/24 E |
| 3,703,114 | 11/1972 | Topopolsky et al. .......... 90/24 E X |
| 3,978,746 | 9/1976 | Kuchuk-Yatsenko et al. ... 83/914 X |

Primary Examiner—Z. R. Bilinsky
Attorney, Agent, or Firm—Fleit & Jacobson

[57] ABSTRACT

The base of the apparatus has the form of a claw clamp with two grips for gripping a rail that are kinematically linked with a clamping cylinder. The apparatus incorporates an upper cutter and side cutters, mounted so that, with the claw clamp closed, the cutting edges of the cutters form an outline embracing the cross-sectional perimeter of the rail. Each side cutter is hinged to the respective grip and mounted thereon for a displacement parallel to the axis of symmetry of the outline formed by the cutting edges of the cutters. The upper cutter is kinematically linked with the rod of the clamping cylinder via a clearance take-up mechanism which provides for lifting the upper cutter and the side cutters hinged thereto to engage the side cutters with the rail foot underside.

7 Claims, 7 Drawing Figures

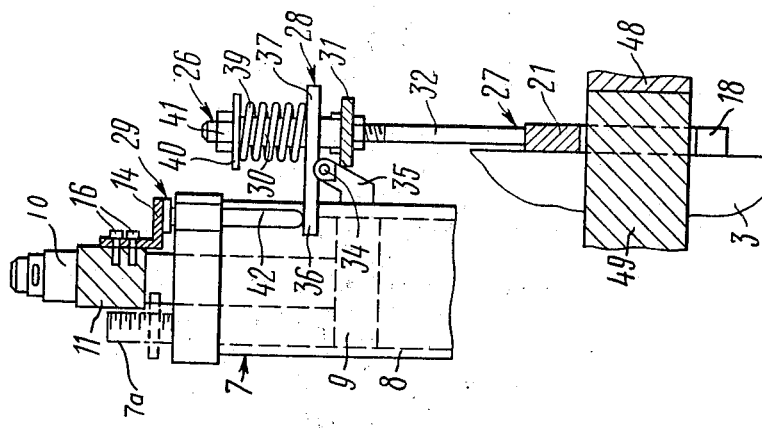
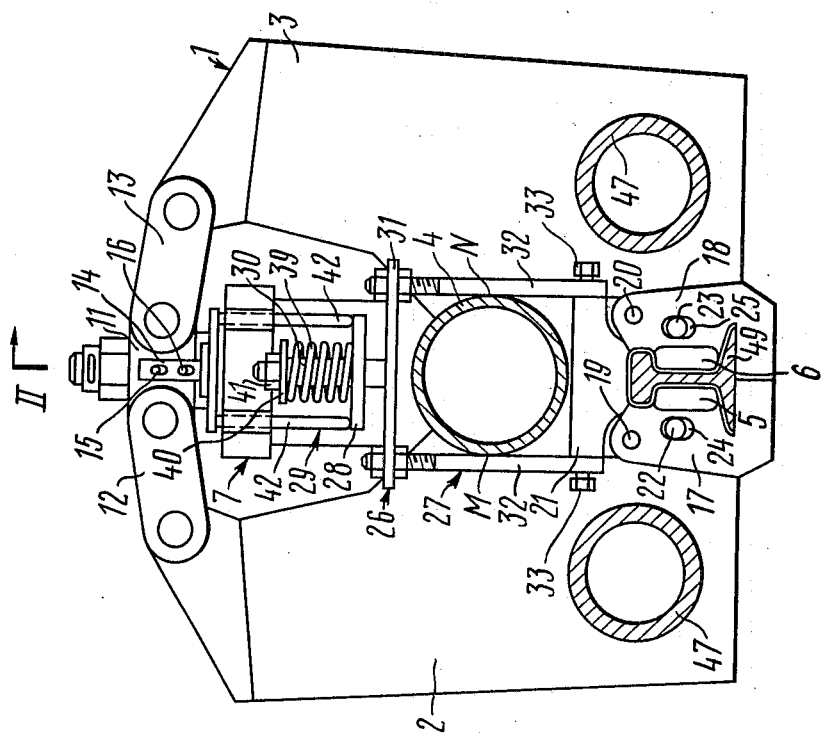

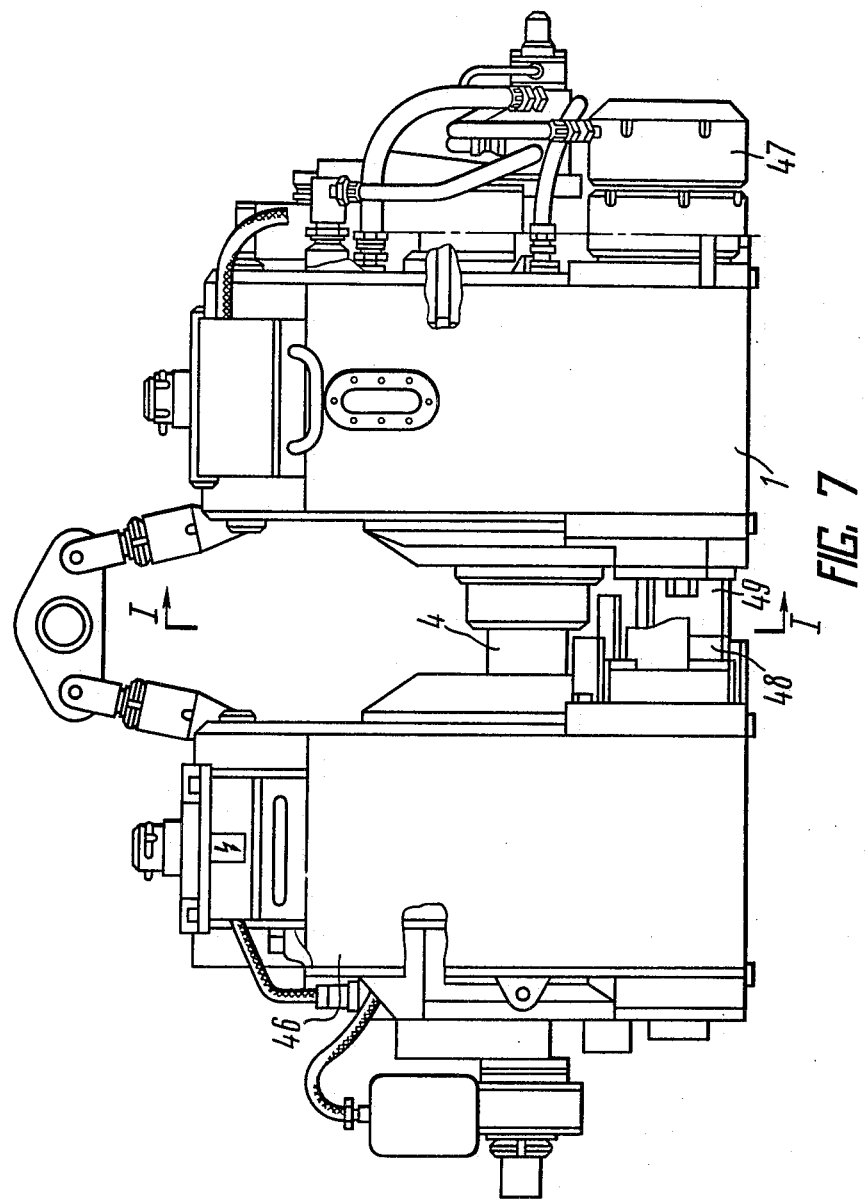

APPARATUS FOR REMOVING FLASH FROM RESISTANCE BUTT-WELD JOINTS IN RAILS

BACKGROUND OF THE INVENTION

1. Field of the Invention

The present invention relates to the equipment for resistance welding of rolled sections and specifically to an apparatus for removing flash from resistance butt-weld joints in rails.

2. Description of the Prior Art

One of the ways of improving an apparatus for removing flash in resistance butt-weld joints in rails is simplification of its design, reduction of the metal and power consumption. This, however, involves the hazard that the apparatus may partially lose some of the useful features, particularly the possibility of flash removal without an allowance for a subsequent machining.

There is known in the art an apparatus for removing flash from resistance butt-weld joints in rails, comprising three cutters mounted on a carriage and embracing the rail section along the entire perimeter (see U.S. Pat. No. 3,451,309, Class 90-24). Each cutter is provided with an individual actuator for setting it to the operative position. This makes it possible to remove flash in the zone of joints from all the rail surfaces, including the underside of the rail foot, with essentially no remainder left.

The provision of individual actuators, however, makes the apparatus more bulky and complicated in construction, which in particular prevents it from being directly incorporated into a machine for resistance butt welding of rails, with the result that cutting off flash is carried out after the metal has cooled down and thus calls for a higher strength of the cutters and an increased capacity of the actuator.

Known in the art is also an apparatus for removing flash from resistance butt-weld joints in rails, comprising a base split along the axis of symmetry of the rail and made in the form of a claw clamp with two grips to engage the rail, a clamping cylinder mounted on the base substantially on the axis of symmetry thereof and kinematically linked with the grips, and cutters mounted so that, with the claw clamp closed, the cutting edges of the cutters form an outline embracing the cross-sectional perimeter of the rail, the shape of the cutting edge of the upper cutter conforming to that of the top portion of the rail head, and the shape of the cutting edges of the two side cutters, either of which is hinged to the respective grip, conforming to that of the side surfaces and rail (see U.S. Pat. No. 3,978,746, Class 83-1). The upper cutter of said apparatus is made up of two halves fixedly attached to the base, and the top portions of the side cutters are hingedly interconnected by a tie piece.

This apparatus is simpler in construction as compared to the apparatus discosed in U.S. Pat. No. 3,451,309, since the cutters are set to the operative position by a single actuator. Moreover, the apparatus disclosed in U.S. Pat. No. 3,978,746 can be incorporated, as a component, into a claw-type machine for resistance butt welding of rails, which will enable flash to be cut off by a much lower effort because this is effected immediately after welding, when the metal is not cooled down yet.

The apparatus allows flash to be cut off with an allowance for a subsequent machining over the entire cross-sectional perimeter of the rail. In the subsequent machining of the entire contact surface including the head and web of the rail the remainder of flash is cut off together with the metal layer being removed. The rail foot underside bearing against sleepers requires essentially no further machining. In laying the rails, however, cases are possible when the rail butt joints are located on the sleepers. The contact between the surfaces of the rail and the sleeper in such places is effected over a small area of the projecting portion of the flash of the rail foot not cut off, which is intolerable under the railroad operating conditions.

In this case, after flash has been removed from the rail foot with the use of the above-described apparatus, an additional grinding of rails is required at the butt joint by a stone, which entails major inconveniences and extra expenses under the field conditions.

SUMMARY OF THE INVENTION

The present invention provides an apparatus for removing flash from resistance butt-weld joints in rails, comprising a base split along the axis of symmetry of the rail and having the form of a claw clamp with two grips to engage the rail, a clamping cylinder mounted on the base substantially on the plane or axis of symmetry thereof and kinematically linked with the grips, and cutters mounted so that, with the claw clamp closed, the cutting edges of the cutters form an outline embracing the cross-sectional perimeter of the rail, the shape of the cutting edge of the upper cutter conforming to that of the top portion of the rail head, and the shape of the cutting edges of the two side cutters, either of which is hinged to the respective grip, conforming to that of the side surfaces and foot of the rail, and according to the invention, includes a clearance take-up mechanism which provides for the displacement of the upper and side cutters along the axis of symmetry of said outline into engagement with the rail foot underside, when the claw clamp closes, and is kinematically linked to the clamping cylinder, the upper cutter being linked with the clearance take-up mechanism by a pull member, and the side cutters being hinged to the upper cutter and mounted on the grips for said displacement.

The apparatus of the above-described construction, while retaining the advantages of the prior art apparatus, namely a simplicity of construction and the possibility of being incorporated into a machine for resistance butt welding of rails, offers a further advantage in that it enables flash to be removed from the rail foot underside with no remainder left and thus makes it possible to obviate the need for separate tools and time losses for removing the flash remainders.

The clearance take-up mechanism of the apparatus according to the invention may include a pusher acted upon by the rod of the clamping cylinder and a lever with two arms disposed one on either side of a fixed fulcrum pin, the first of the arms being coupled with the pusher, and the second, with the pull member.

The second arm of the lever may be provided with a slit at the end, and the pull member may be spring-loaded, passed through the slit and installed for sliding relative to fixed base guides.

With such an arrangement it is expedient that a thrust member contacting the pusher at the end of the piston stroke is fixedly coupled with the cylinder rod, which makes it possible to use a cylinder with non-adjustable stroke piston for the pressing of the cutters.

In a special case, the clamping cylinder rod may be fixedly coupled with the pusher, and the latter may be hinged to the first arm of the lever.

In this case an embodiment is possible incorporating a clamping cylinder with an adjustable stroke piston, where an end of the pull member is hinged to the second arm of the lever, and the other end is hinged to the upper cutter.

Each side cutter of the apparatus may be provided with a slot parallel to the axis of symmetry of the outline formed by the cutting edges of the upper and side cutters with the claw clamp closed, the hinge pin of the joint between upper cutter and the respective grip being fixedly secured to the latter and fitted in said slot in the side cutter so that the pin can perform a relative motion within the slot length.

BRIEF DESCRIPTION OF THE DRAWINGS

The invention will now be explained by the description of embodiments thereof with reference to the accompanying drawings, in which:

FIG. 1 diagrammatically represents the apparatus for removing flash from resistance butt-weld joints in rails according to the invention (a sectional view taken along line I—I in FIG. 7);

FIG. 2 is a sectional view taken along line II—II in FIG. 1;

FIG. 5—when using the clamping cylinder with a non-adjustable stroke piston;

FIG. 6—when using the clamping cylinder with an adjustable stroke piston;

FIG. 7 diagrammatically represents a claw-type machine for resistance butt welding of rails incorporating the apparatus for removing flash according to the invention.

DETAILED DESCRIPTION OF THE INVENTION

Figure 3:
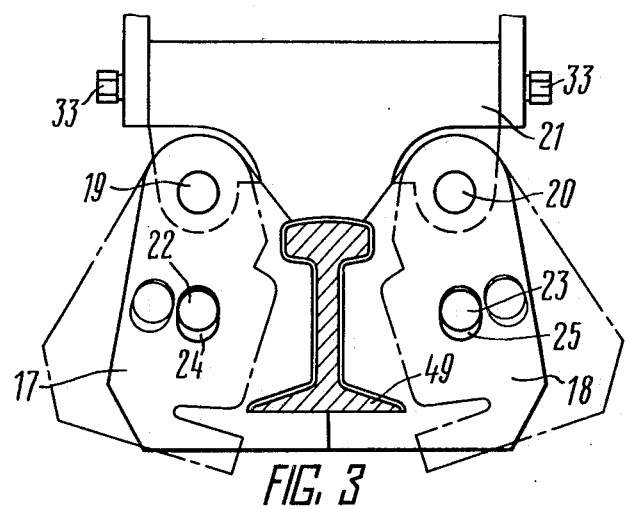
FIG. 3 is an enlarged view of the upper and side cutters of the apparatus according to the invention in the closed and open positions.

A base 1 (FIG. 1) of the apparatus for removing flash from resistance butt-weld joints in rails has the form of a claw clamp comprising two grips 2 and 3 mounted for counter-rotation relative to each other on a common fixed trunnion 4 which divides each grip in two portions, upper and lower. The lower portions of the grips 2 and 3 terminate in jaws 5 and 6 for embracing the rail. The common fixed trunnion 4 is hollow and is arranged on the plane or axis of symmetry of the claw clamp, coinciding with the plane or axis of symmetry of the rail clamped in the jaws 5 and 6.

Mounted on the trunnion 4 for rotation thereon is a clamping cylinder 7 comprising a housing 8 (FIG. 2), a piston 9 movably mounted in a housing 8, and a rod 10 fixedly attached to the piston 9 and carrying a crossbeam 11 secured thereon. The crossbeam 11 is connected with the upper ends of the claw clamp grips 2 and 3 by drag links 12 and 13 (FIG. 1). A thrust piece 14 (FIGS. 1,2) whose function will be clear from the further description is fixedly coupled with the crossbeam 11. The thrust piece 14 is vertically adjustable within the length of slots 15 (FIG. 1), wherein the heads of fastening screws 16 are fitted.

The grips 2 and 3 carry two side cutters 17 and 18 (FIGS. 1,3) coupled at points 19 and 20 with an upper cutter 21 by means of hinge joints which will be referred to as the first hinge joints. The cutting edge of the upper cutter 21 is shaped in conformity with the shape of the top portion of the rail head. The cutting edges of the side cutters 17 and 18 are shaped in conformity with the shape of the side surfaces and foot underside of the rail.

The side cutters 17 and 18 are connected with the grips 2 and 3 by means of hinge pins 22 and 23 of the second hinge joints. The hinge pins 22 and 23 are fixedly secured to the grips 2 and 3 and fitted in the side cutters 17 and 18 for a displacement along slots 24 and 25 provided therein. The width of the slots 24 and 25 corresponds to the diameter of the hinge pins 22 and 23. The slots 24 and 25 are parallel to the axis of symmetry of the closed outline formed by the cutting edges of the upper cutter 21 and side cutters 17 and 18 when the latter are closed.

The apparatus comprises a clearance take-up mechanism 26 (FIG. 1) which provides for the displacement of the rail along the axis of symmetry thereof until the cutting edges engage the rail foot. The clearance take-up mechanism 26 includes a pull member 27 (FIGS. 1,2,4) coupled with the upper cutter 21, a lever 28 (FIGS. 2,4) interacting with the pull member 27, and a pusher 29 coupled with the lever 28 and acted upon by the thrust piece 14 of the crossbeam 11.

Figure 4:
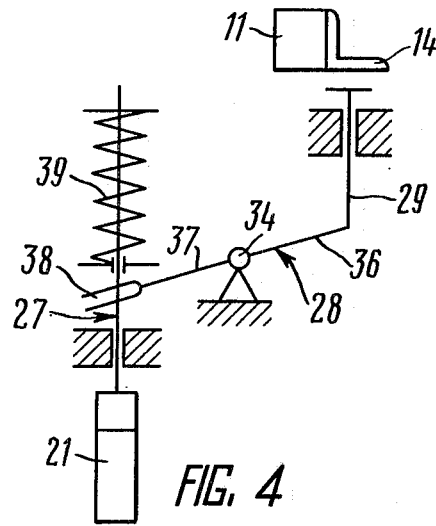
FIG. 4 represents the kinematic diagram of the preferred embodiment of the clearance take-up mechanism in the apparatus for removing flash from resistance butt-weld joints in rails according to the invention.

In the preferred embodiment of the invention, illustrated in FIGS. 1, 2, 4, the pull member 27 is compound and comprises a rod 30 (FIGS. 1, 2), a crossbar 31 perpendicular to the rod 30, and two side members 32 (FIG. 1) fixedly coupled with the crossbar 31 and attached to the upper cutter 21 by screws 33. The crossbar 31, member plates 32 and upper cutter 21 form a frame embracing the fixed trunnion 4 and adjoining the trunnion at points M and N of contact of the side members 32.

Thus the fixed trunnion 4 serves as a guide for the pull rod 27 when the latter effects translatory motion. In addition, such an arrangement enables the pull rod 27 to rotate with respect to the trunnion 4 when the clamping cylinder 7 rotates around the same trunnion.

The lever 28 (FIG. 2) has a fixed fulcrum pin 34 fitted in the holes in a bracket 35 fixedly coupled with the housing 8 of the clamping cylinder 7. A first arm 36 of the lever 28 contacts the pusher 29, whereas a second arm 37 disposed on the opposite side of the fixed fulcrum pin 34 is forked (FIGS. 2,4) and has a slit 38 for the rod 30 of the pull member 27.

A compression spring 39 (FIGS. 1,2,4) restricted at the top by a washer 40 and a nut 41 screwed onto the threaded end of the rod 30 is put on the rod 30 passed through the slit 38.

The pusher 29 of the clearance take-up mechanism 26 has the form of two identical pins 42 (FIG. 1) mounted parallel to each other for sliding in the openings of the cover of the housing 8 of the clamping cylinder 7. The pins 42 are mounted so that their top ends project above said cover for a length smaller than the length of the stroke of the piston 9, which enables the pusher 29 be acted upon by the thrust piece 14 at the end of the stroke of the piston 9. The bottom ends of the pins 42 of the pusher 29 thrust against the first arm 36 of the lever 28.

Figure 6:
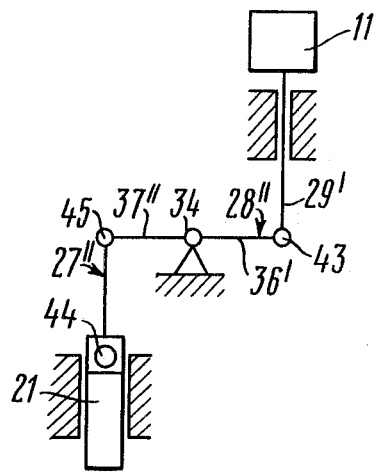
FIGS. 5 and 6 represent the kinematic diagrams of alternative embodiments of the clearance take-up mechanism.
Figure 5:
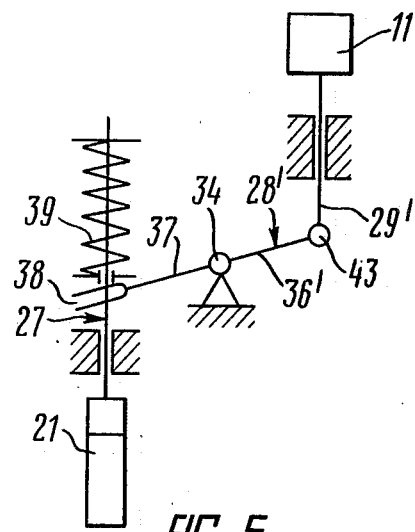

FIGS. 5 and 6 illustrate the kinematic diagrams of another two embodiments of the clearance take-up mechanism 26, wherein the functionally similar elements are denoted by the same reference numerals as in FIGS. 1 through 4 but with one or two marks respectively.

The embodiment of the clearance take-up mechanism 26 illustrated in FIG. 5 differs from the above-described one in a fixed attachment of the pusher 29' to the crossbeam 11 and a hinged coupling of the pusher at point 43 to the first arm 36' of the lever 28'. The discrepancy between the actual length of stroke of the piston 9 and the length of stroke sufficient for displacing the side cutters 17 and 18 into engagement with the rail foot underside is in this case compensated for by the compression spring 39 alone.

The embodiment of the clearance take-up mechanism 26 illustrated in FIG. 6 corresponds to the case when the clamping cylinder has an adjustable stroke piston 9.

The adjustment of stroke of the piston 9 is effected by any means known in the art, such as by an adjustable stop 7a (illustrated in phantom in FIG. 2) mounted on the clamping cylinder 7 and interacting with the crossbeam 11. In this case the pull member 27" is formed as a drag link whose one end is connected with the upper cutter 21 by means of a hinge pin 44, whereas the other end is connected with the appropriately shaped second arm 37" of the lever 28" by means of a hinge pin 45.

The apparatus for removing flash from resistance butt-weld joints in rails as described above may be employed either separately or, which is preferable, as a component of a claw-type machine for resistance butt welding of rails (FIG. 7).

In the latter case the base 1 shown in FIG. 1 which represents a sectional view taken along line 1—1 in FIG. 7 is a movable part of the machine whose stationary base is denoted by reference numeral 46. The stationary base 46 is essentially a claw clamp similar to the claw clamp of the base 1 and having the fixed trunnion 4 in common therewith.

Fixedly attached to the machine base 1 are upset actuating cylinders 47 (FIGS. 1,7) whose rods are fixedly coupled with the stationary base 46.

The apparatus incorporated into the machine for resistance butt welding of rails functions as follows.

Rails 48 and 49 (FIG. 7) to be welded together are clamped in the jaws 4 and 5 of the claw clamp of the base 1 (FIG. 1) which is a movable part of the machine and in similar jaws of the stationary base 46 (FIG. 7).

For this purpose, working fluid is fed into the upper chamber of the clamping cylinder 7. As the piston 9 (FIG. 2) with the rod 10 and the crossbeam 11 attached thereto moves down, the drag links 12 and 13 turn upwards relative to the hinge pins common with the crossbeam 11, tending to take the horizontal position. As a result, the upper ends of the grips 2 and 3 move apart, turning around the common fixed trunnion 4; their lower ends with the jaws 5 and 6 correspondingly move towards each other until they engage the web of the rail 49. On engaging the rail web, the jaws 5 and 6 self-align thereto owing to the swing of the entire described system together with the clamping cylinder 7 relative to the trunnion 4. The jaws of the stationary base 46 clamp the rail 48 in a similar manner.

As the jaws 5 and 6 move towards each other, the side cutters 17 and 18, coupled with the jaws by the hinge pins 22 and 23, hinged with the upper cutter 21 which functions as a tie rod, and initially occupying the position shown in phantom in FIG. 3, rotate towards each other relative to the points 19 and 20. At the moment when the rail 49 becomes freely resting by the bottom portion of its head on the jaws 5 and 6, the side cutters 17 and 18 start embracing the rail 49 over its cross-sectional perimeter.

The cutting edges of the side cutters 17 and 18 and upper cutter 21 are shaped so that when the edges close around the rail 49, a clearance of about 1.5–2 mm between the edges and the surface of the rail is left along the entire perimeter, which eliminates the risk of jamming the rail 49 between said cutting edges.

In the preferred embodiment of the invention (FIGS. 2, 4), the thrust piece 14 of the crossbeam 11 at the end of the stroke of the piston 9 of the clamping cylinder 7 depresses the pins 42 of the pusher 29 of the clearance take-up mechanism 26. The pins 42 sink, forcing down the first arm 36 of the lever 28 which is thus turned about the fulcrum pin 34. The second arm 37 of the lever 28 rises and shifts up the pull member 27 together with the upper cutter 21 suspended therefrom on the screws 33. The side cutters 17 and 18 move upwards together with the upper cutter 21, the walls of the slots 24 and 25 in the side cutters, which are parallel to the axis of symmetry of the rail and vertically disposed at this moment, freely slide relative to the hinge pins 22 and 23 fixedly attached to the grips 2 and 3.

The stiffness of the spring 39 is selected such that the spring is not compressed when there is no resistance to the displacement of the pull member 27 together with the cutters, said displacement being caused by the motion of the lever 28. If the piston 9 continues to travel after the lower cutting edges of the side cutters 17 and 18 have engaged the underside of the foot of the rail 49, then the lever 28, turning, compresses the spring 39 whose presence thus makes it possible to obviate the necessity for exactly matching the travel of the pusher 29 acted upon by the thrust piece 14 to the required displacement of the cutters.

The entire length of the stroke of the piston 9 can be also employed for the displacement of the cutters, as in the embodiment of the invention illustrated in FIG. 5, where the pusher 29 is fixedly coupled with the crossbeam 11. The compressive ability of the spring 39 is in this case correspondingly higher than in the above-described embodiment shown in FIGS. 2,4.

To effect lifting the cutters in the embodiment of the invention illustrated in FIG. 6, stroke of the piston 9 should be adjusted so that, with the selected ratio of arms of the lever 28", it corresponds to the vertical displacement of the cutters for the width of the clearance between the underside of the foot of the rail 49 and the lower cutting edges of the side cutters 17 and 18.

The above-described action of the clearance take-up mechanism 26 results in that the side cutters 17 and 18 jointly with the upper cutter 21 embrace the rail 49 along its entire cross-sectional perimeter, thereby ensuring the predetermined clearance at the sides of the web and along the head of the rail and the cutting edges of the side cutters 17 and 18 intimately mate with the underside of the foot of the rail 49 as shown in FIG. 3.

Next, the heating is switched on, the upset actuating cylinders 47 shift the base 1 together with the rail 49 clamped therein towards the stationary base 46, and butt welding of the rails 48 and 49 takes place.

Then the pressure in the clamping cylinder 7 is relieved, with the result that the end of the rail 49 clamped by the claw clamp of the base 1 is released from the jaws 5 and 6 (FIG. 1). However, the jaws 5 and 6, as well as the side cutters 17 and 18, do not open completely, but only withdraw from the rail 49 for a distance enabling them to slide along the rail 49. The base 1 is shifted with respect to the welded rail towards the stationary base 46 by an additional stroke of the upset actuating cylinders 47. During the latter shift, the upper cutter 21 and the side cutters 17 and 18 cut off flash over the entire cross-sectional perimeter of the welded rail, the flash on the underside of the rail foot being cut off with an essentially zero allowance.

After flash has been cut off, working fluid is fed into the lower chamber of the clamping cylinder 7 (FIG. 2), the piston 9 together with the rod 10 and the crossbeam 11 ascends, the pusher 29 is shifted upwards by the spring 39 (FIGS. 2,4) or carried by the crossbeam 11 (FIGS. 5 and 6) connected with the pusher, the lever 28 (FIG. 4), or 28' or 28" respectively (FIGS. 5 and 6), turns and forces down the pull member 27 together with the upper cutter 21 and the side cutters 17 and 18. Next, the upper ends of the grips 2 and 3 move toward each other under the action of the drag links 12 and 13, whereas the lower ends of the grips move apart and open the side cutters 17 and 18 (FIG. 3, phantom lines), thus completely releasing the welded rail.

The remainder of flash on the side and top surfaces of the rail is removed in the subsequent machining of the rail. The rail foot underside requires no additional machining.

When the apparatus for removing flash is employed outside the machine for resistance butt welding of rails, then an individual clamping actuator is fitted in the apparatus, and the welded rail is shifted with respect to the cutters by means of a separate actuator.

The claimed apparatus enables the flash to be removed from the rail foot underside with no remainder left and thus makes it possible to cut down the labour and time spent for this operation due to eliminating a subsequent manual trimming of flash remainder. When the above-described apparatus is employed as a component of a rail welding machine, its manufacturing cost is reduced in fact to the cost of the cutters and of the mechanism for pressing thereof; the flash cut-off operation requires in this case the minimum power consumption since the metal being removed has not enough time to cool down after welding.

What is claimed is:

1. An apparatus for removing flash from resistance butt-weld in rails, the rails having a plane of symmetry, a top portion, a foot, and side surfaces interconnecting the top portion and the foot, the apparatus comprising:
    a base split along the plane of symmetry of the rail and having the form of a claw clamp with two grips for engaging the rail;
    clamping cylinder mounted on said base substantially on the plane of symmetry thereof and comprising a housing, a piston movably mounted in the housing, and a rod fixedly connected with the piston;
    an upper cutter whose cutting edge is shaped in conformity with the shape of the top portion of the rail head, said upper cutter being kinematically linked with said clamping cylinder;
    two side cutters whose cutting edges are shaped in conformity with the shape of the side surfaces and foot of the rail; said side cutters being adapted to be hingedly connected with said upper cutter and being adapted to be coupled with the grips of said claw clamp so that, with the latter closed, the cutting edges of said side cutters jointly with the cutting edge of said upper cutter form a closed outline embracing the cross-sectional perimeter of the rail;
    two first hinge joints for hingedly connecting said upper cutter with said side cutters;
    two second hinge joints, each of which couples one of said side cutters with a respective grip so that said side cutters can move parallel to the plane of symmetry of said closed outline;
    clearance take-up mechanism providing for the displacement of said upper and side cutters along the plane of symmetry of said closed outline into engagement with the underside of the rail foot and kinematically linking said upper cutter with the rod of said clamping cylinder; said clearance take-up mechanism comprises a pull member connected with said upper cutter.

2. An apparatus according to claim 1, wherein each of said second hinge joints comprises a hinge pin fixedly attached to one of the grips, and each of said side cutters has a slot parallel to the plane of symmetry of said closed outline and encircling the hinge pin of the respective of the second hinge joints so that the hinge pin can effect a relative motion within the length of this slot.

3. An apparatus according to claim 1, wherein said clearance take-up mechanism comprises a pusher acted upon by the rod of said cylinder and a lever having a fixed fulcrum pin attached to the housing of said clamping cylinder, a first arm coupled with said pusher, and a second arm coupled with the pull member of said clearance take up mechanism, the first and the second arm of said lever being disposed on the opposite sides of the fixed fulcrum pin of the lever.

4. An apparatus according to claim 3, wherein said base comprises fixed guides, and wherein said clearance take-up mechanism includes means for spring loading the pull member of said clearance take-up mechanism, the pull member being passed through a slit provided at the end of the second arm of said lever, and installed for sliding relative to the fixed guides of said base.

5. An apparatus according to claim 3, wherein said clearance take-up mechanism includes means for coupling the rod of said clamping cylinder with said pusher, said pusher being hinged to the first arm of said lever.

6. An apparatus according to claim 4, wherein there is a thrust piece fixedly coupled with the rod of said clamping cylinder and contacting said pusher at the end of the stroke of the piston of said clamping cylinder.

7. An apparatus according to claim 5, wherein the pull member of said clearance take-up mechanism is hinged by its one end to the second arm of said lever and by its other end to said upper cutter, the piston of said clamping cylinder having an adjustable stroke.

* * * * *